(No Model.)

4 Sheets—Sheet 1.

H. FROST.
FLUID METER.

No. 293,317.

Patented Feb. 12, 1884.

Witnesses
Chas. R. Butt
Chas. H. Fowler

Inventor
Herbert Frost
by W. H. Babcock
Attorney (No Model.) 4 Sheets—Sheet 3.

H. FROST.
FLUID METER.

No. 293,317. Patented Feb. 12, 1884.

Witnesses
Chas. R. Burr
Chas. H. Fowler

Inventor
Herbert Frost
by Wm H Babcock
Attorney (No Model.) 4 Sheets—Sheet 4.

H. FROST.
FLUID METER.

No. 293,317. Patented Feb. 12, 1884.

Witnesses
Chas. R. Burr
Chas. N. Fowler

Inventor
Herbert Frost
by Wm H Babcock
Attorney

UNITED STATES PATENT OFFICE.

HERBERT FROST, OF MANCHESTER, COUNTY OF LANCASTER, ENGLAND.

FLUID-METER.

SPECIFICATION forming part of Letters Patent No. 293,317, dated February 12, 1884.

Application filed December 7, 1883. (No model.) Patented in England May 31, 1883, No. 2,720.

*To all whom it may concern:*

Be it known that I, HERBERT FROST, a subject of the Queen of Great Britain, residing at Manchester, in the county of Lancaster, England, engineer and manager of the Manchester Water Meter Company, (Limited,) have invented a certain new and useful Improvement in Fluid-Meters, applicable also for other purposes, (for which I have obtained a patent in Great Britain, No. 2,720, bearing date May 31, 1883,) of which the following is a specification.

My invention relates to an improvement in meters of the principle and construction known as "piston-meters," used for measuring water or other fluids, and is an improvement upon the meter for which Letters Patent were granted to me on the 7th day of May, A. D. 1874, No. 1,619; and the objects of my invention are, first, to improve the valves for admitting and discharging the fluid to be measured, and to actuate the movable parts of these valves in a more satisfactory manner than has hitherto been accomplished; and, secondly, to improve the method of packing and guiding the piston-rod of the measuring-cylinder. I attain these objects by the mechanism illustrated in the accompanying four sheets of drawings, in which—

Figure 1:
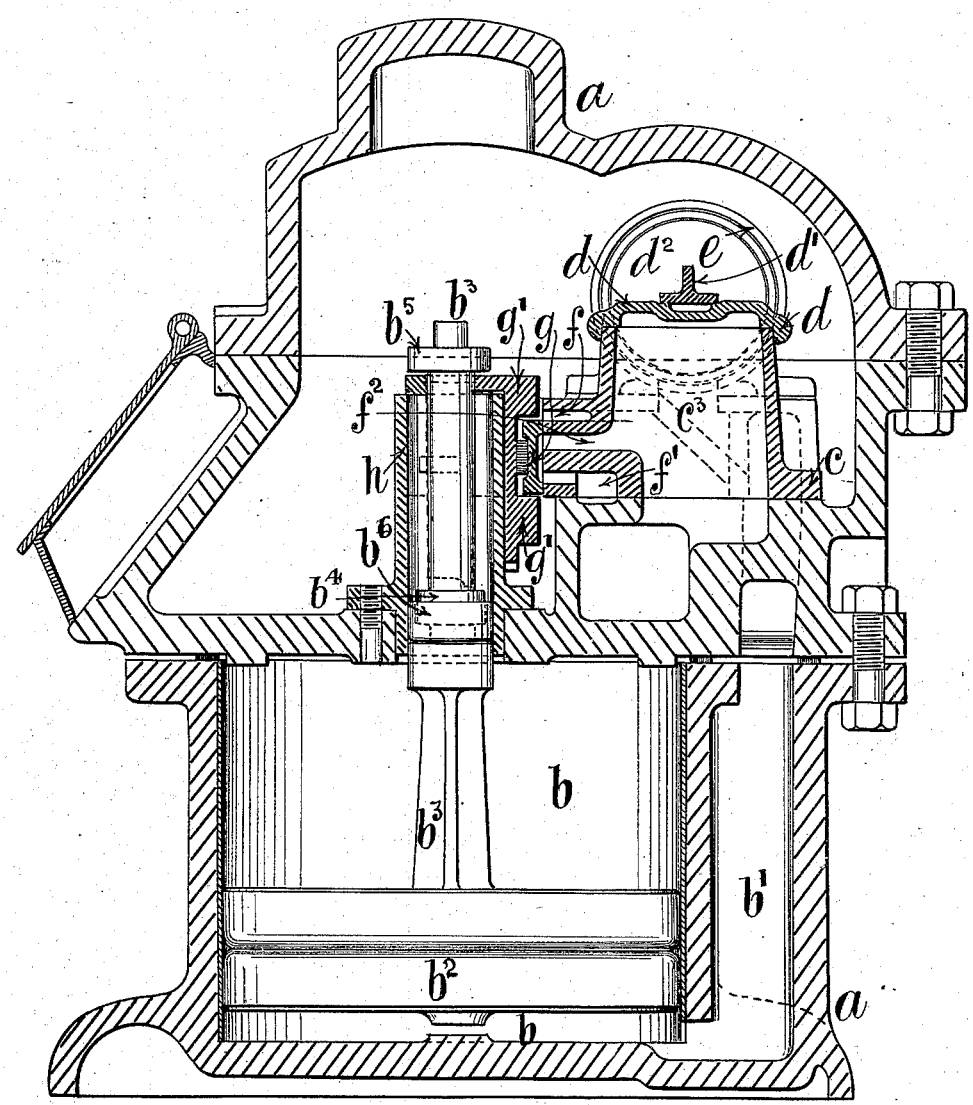
Figure 2:
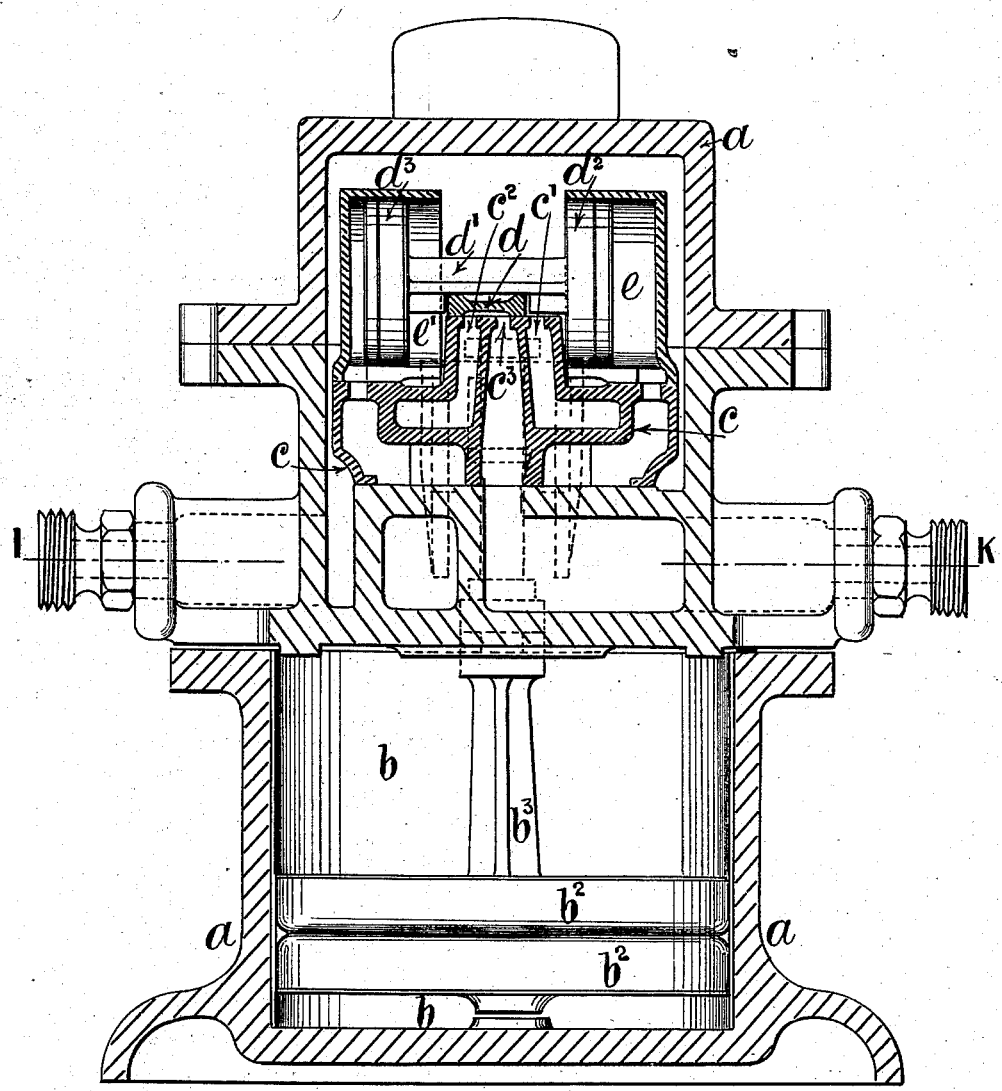
Figure 3:
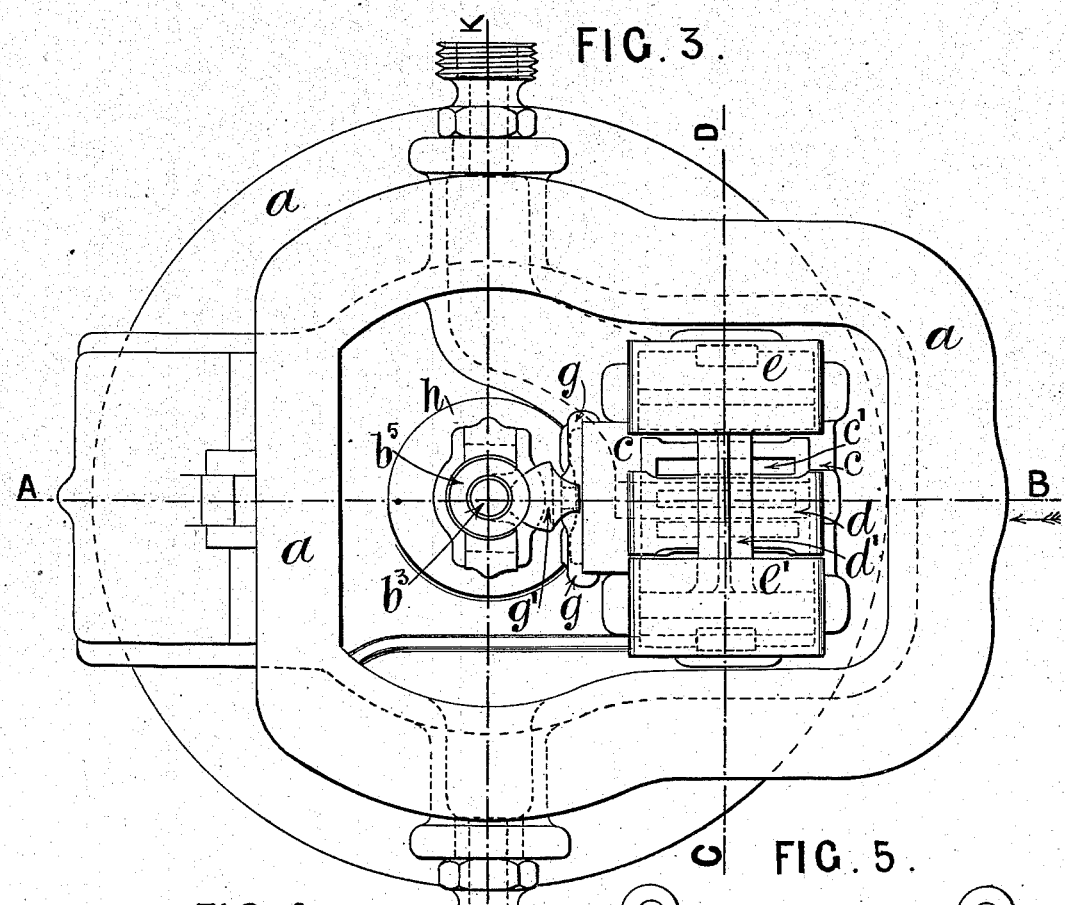
Figures 4, 5:
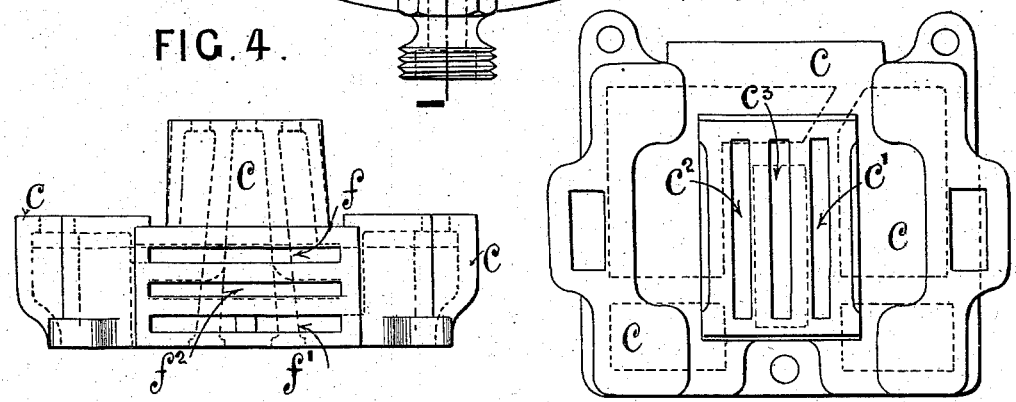
Figure 7:
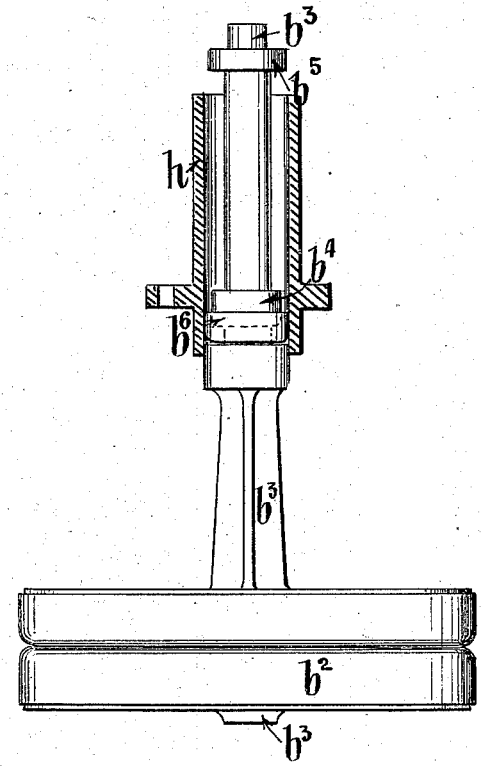
Figure 6:
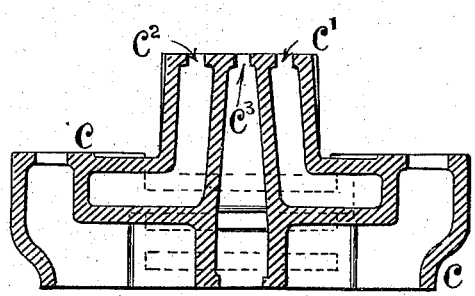

Figure 1 is an elevation of the meter, partly in section, through the line A B, Fig. 3. Fig. 2 is an elevation, partly in section, through the line C D, Fig. 3. Fig. 3 is a plan with the cover removed. Figs. 4, 5, and 6 are a front view, a plan, and a section, respectively, of the metal block containing the valve ports and passages; and Fig. 7 is a detached view of the piston, piston-rod, packing, and guide-tube.

Similar letters refer to similar parts throughout the several views.

The outer metal casing, $a$, of the meter is shown constructed in three pieces, bolted together in any convenient manner. $b$ is the measuring-cylinder, and $b'$ the passage leading from the upper part of the meter to the bottom of the cylinder $b$. $b^2$ is the piston, and $b^3$ the piston-rod. The metal block $c$ contains on its upper side three ports, $c'\ c^2\ c^3$, of which $c'$ communicates through the passage $b'$ to the lower part of the measuring-cylinder, and the port $c^2$ to the upper part of the measuring-cylinder above the piston. The middle port, $c^3$, is connected direct to the outlet or discharge pipe. The recessed sliding valve-cover $d$ is connected loosely to and is operated by a horizontal piston-rod, $d'$, which is provided with pistons $d^2\ d^3$—one at each end—fitted in the supplementary cylinders $e\ e'$, which are open at one end, and secured to the metal block $c$.

On the front face of the metal block $c$ are ingress, egress, and discharge ports $f\ f'\ f^2$, respectively, similar to the three ports $c'\ c^2\ c^3$, already described. The upper port, $f$, communicates with the cylinder $e$, the port $f'$ with the cylinder $e'$, and the port $f^2$ with the outlet or discharge pipe. The recessed sliding valve-cover $g$ is loosely connected to a valve-mover, $g'$, with a projection on the top, by which it is lifted by a collar, $b^4$, on the main piston-rod, when the piston has almost finished its upward stroke, and is lowered by another collar, $b^5$, on the top of the piston-rod, when the piston has nearly reached the end of its downward stroke. The main piston-rod $b^3$ passes through and is guided in a smoothly-bored tube, $h$, secured to the middle part of the casing, and instead of a stuffing-box there is fixed on a part of the rod $b^3$, near its center, a packing, $b^6$, (see Fig. 7,) of leather, india-rubber, or other suitable material, by which the passage of fluid is prevented, and the piston-rod guided in a more efficient manner, and is capable of working with greater ease than when a stuffing-box is employed. Water or other fluid to be measured is admitted to the middle part of the meter through the inlet-pipe $i$ and discharged through the outlet-pipe $k$.

The action of the apparatus is as follows: When the piston is at the bottom of the measuring-cylinder $b$, as shown in the drawings, and water or other fluid, under pressure, is admitted to the meter, it flows through the open port $f$ and fills the small cylinder $e$. Water also flows through the open port $c'$, and down the passage $b'$ into the bottom of the measuring-cylinder $b$, causing the piston $b^2$ to rise, and as the piston-rod $b^3$ nears the end of its upward stroke the collar $b^4$ comes in contact with the projection on the valve-mover $g'$, moves the valve-cover $g$ upward, and opens the port $f'$. This admits water, under pressure, to the supplementary cylinder $e'$, which forces the piston $d^3$ outward, moving the piston-rod $d'$, slide-valve cover $d$, and opening the port $c^2$. When the piston $d^3$ is forced outward, the piston $d^2$ is driven inward, and expels the water from the cylinder $e$, through the port $f$, under the recessed valve-cover $g$, through the port $f^2$, communicating with the discharge-pipe $k$. The main piston having reached the top of its stroke and the port $c^2$ now being open, water flows through the port $c^2$ into the top of the measuring-cylinder $b$ and forces down the piston $b^2$. This drives the water up the passage $b'$, through the port $c'$, under the recessed valve-cover $d$, down the port $c^3$, into the discharge-pipe $k$. As the piston-rod approaches the bottom of its stroke, the collar $b^5$ comes in contact with the projection on the valve-mover $g'$, moves it and the valve-cover $g$ downward, and opens the port $f$. This admits water, under pressure, through the port $f$ into the cylinder $e$, which forces the piston $d^2$ outward, moving the piston-rod $d'$, and sliding valve-cover $d$, thus opening the port $c'$, again reversing the stroke. Water flows into the bottom of the measuring-cylinder $b$, and the piston $b^2$ again rises and expels the water above it from the measuring-cylinder $b$, up the passage and through the port $c^2$, under the recessed valve-cover $d$, and down through the port $c^3$ and passage communicating with the discharge-pipe $k$. As the piston-rod nears the end of its upward stroke, the port $f'$ is opened and water admitted to the supplementary cylinder $e'$, again reversing the stroke, forcing down the piston $b^2$ and driving the water below it up the passage $b'$, as previously described.

The apparatus, as above described, may be employed, either as a fluid-meter or as a water-motor. When used as a meter to measure water or other fluid, the wheel-work of the index or indicator is connected to or actuated by the piston-rod $b^3$, or any convenient moving part of the apparatus. When used as a water-motor, the rod $b^3$ of the piston $b^2$ is brought through the top casing or cover, or through the bottom of the measuring-cylinder $b$, and suitably connected to the parts to which the power is intended to be applied.

Having stated the nature of my invention and described the manner of performing the same, I declare that what I claim, and desire to secure by Letters Patent of the United States, is—

In a fluid-meter or water-motor, the block or casting $c$, with its ports $c'$ $c^2$ $c^3$ and $f$ $f'$ $f^2$, combined with the supplementary cylinders $e$ $e'$ and pistons $d^2$ $d^3$, respectively, with the valve-covers $d$ and $g$, for controlling the ingress and egress of fluid to and from the main cylinder $b$, substantially in the manner and for the purposes described.

The foregoing specification of my improvement in fluid-meters, applicable also for other purposes, signed by me this 24th day of November, 1883.

HERBERT FROST.

Witnesses:
 HERBERT FROST, Jr.,
  *Engineer.*
 H. B. BARLOW,
  *Patent Agent, Manchester.*